May 23, 1933.    G. A. SCHUCHMAN    1,910,063
ELECTRIC GENERATOR
Filed Oct. 19, 1931    3 Sheets-Sheet 1
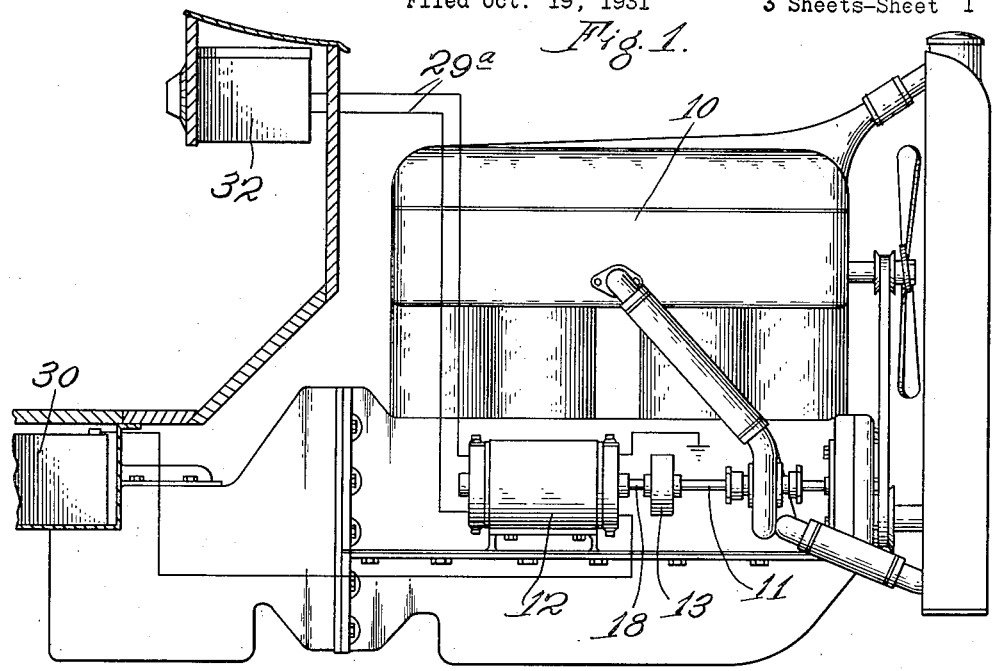
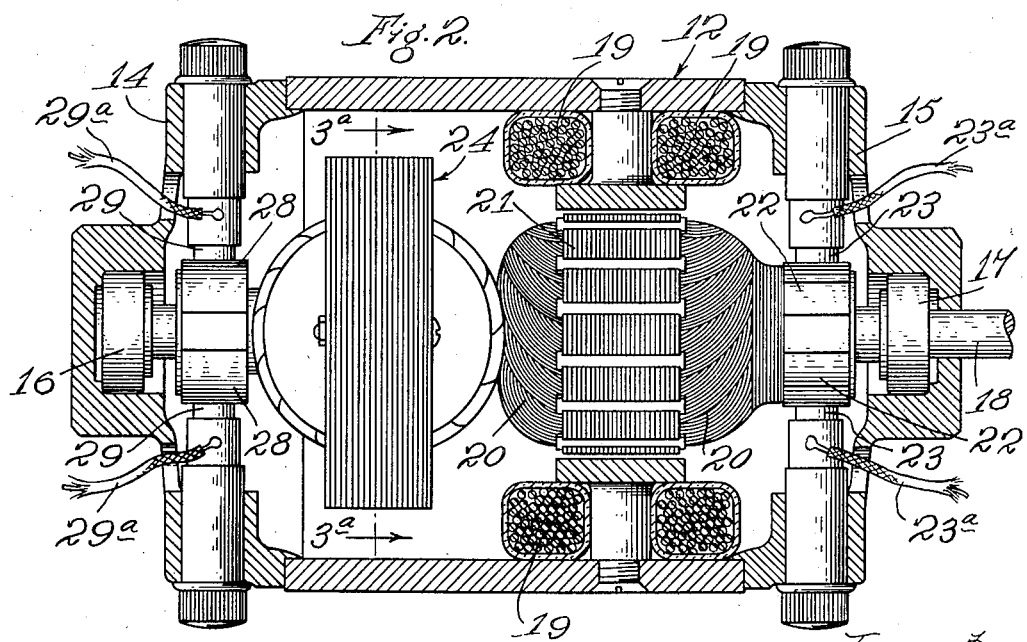
Inventor:
George H. Schuchman
By Dyrenforth, Lee, Chritton & Wiles
Attys.

May 23, 1933.  G. A. SCHUCHMAN  1,910,063
ELECTRIC GENERATOR
Filed Oct. 19, 1931   3 Sheets-Sheet 2
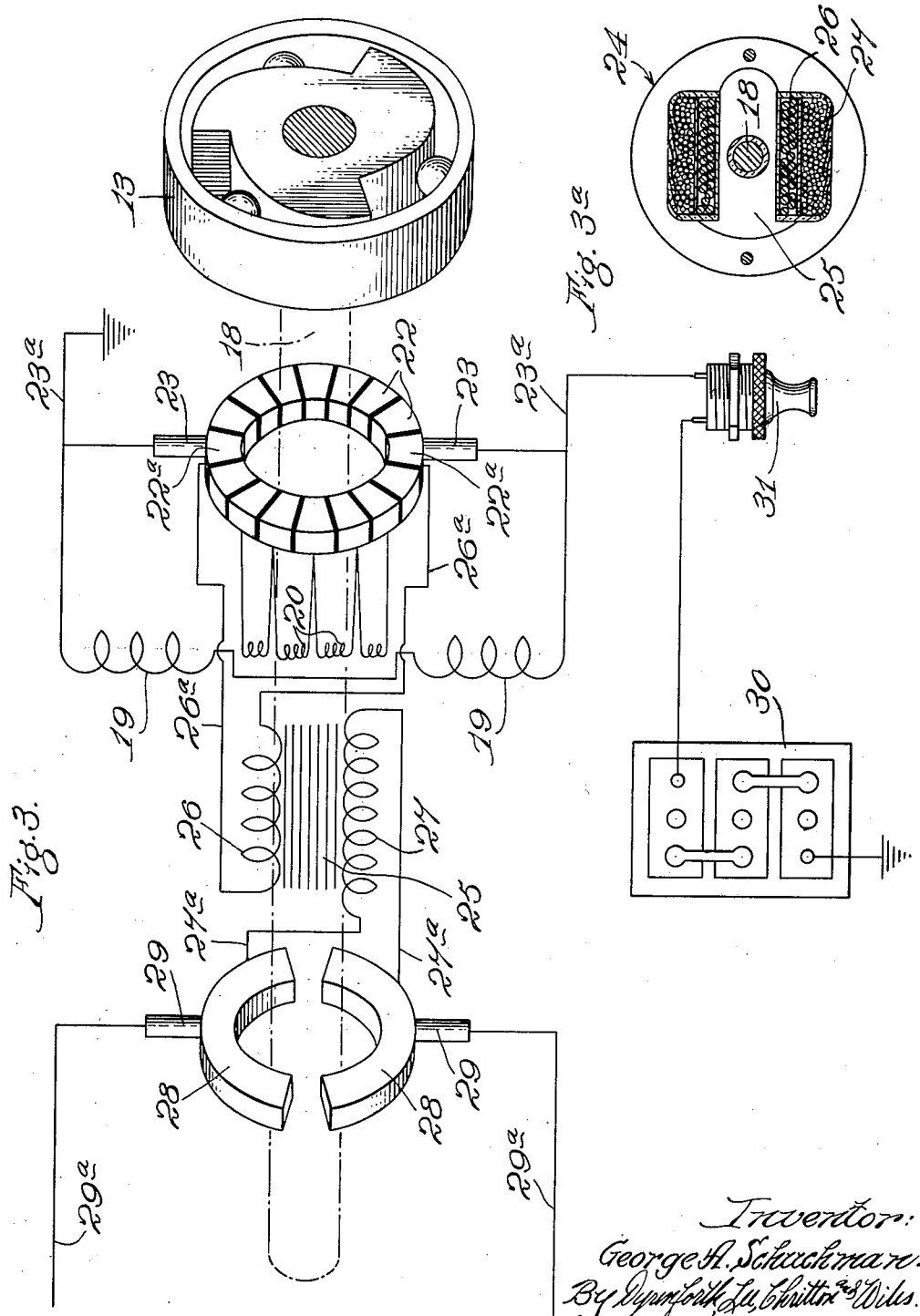

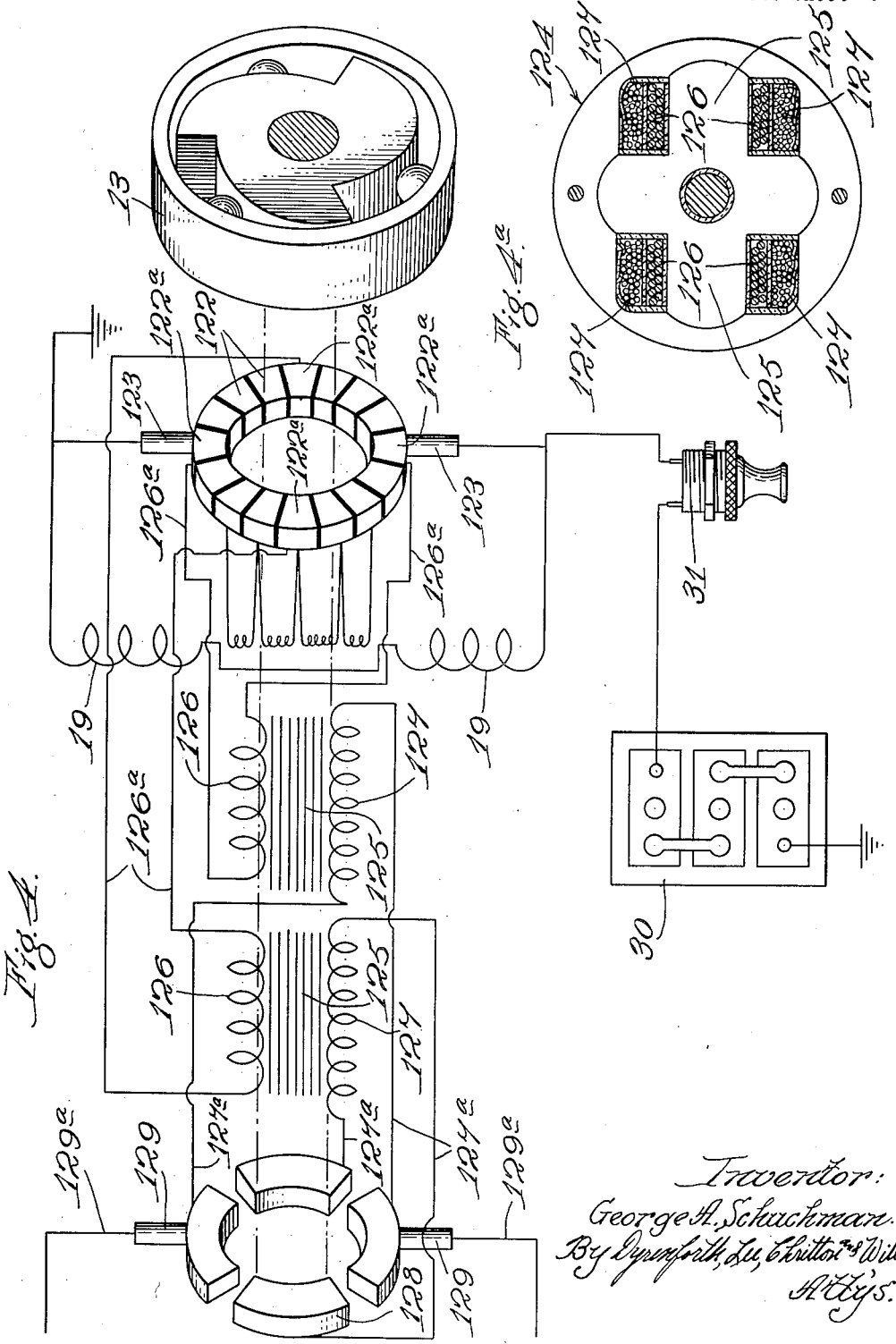

Patented May 23, 1933

1,910,063

UNITED STATES PATENT OFFICE

GEORGE A. SCHUCHMAN, OF CHICAGO, ILLINOIS, ASSIGNOR, BY MESNE ASSIGNMENTS, TO ARBEL CORPORATION, OF CHICAGO, ILLINOIS, A CORPORATION OF DELAWARE

ELECTRIC GENERATOR

Application filed October 19, 1931. Serial No. 569,792.

This invention relates to improvements in electric generators and, more especially, such a generator adapted for furnishing relatively high voltage currents for operating radio receivers.

My invention is well adapted for use on automobiles and in other places where it is desired to operate radio receivers and where electric power with suitable characteristics is not readily available. By the use of my invention, the customary combersome, expensive and heavy "B" batteries may be eliminated.

Another feature of my invention is the provision of such a generator that may be used on an automobile in place of the conventional generator now employed for charging the six or twelve volt ignition, starting and lighting battery. My improved generator, besides performing this function, will deliver a relatively high voltage direct current that can be used for radio receiver operation in place of "B" batteries. When thus used on an automobile, means are provided to cause the generator to continue to function to produce such current, even though the automobile motor stops or slows down below an effective operating speed.

My improved generator may be used on an automobile in place of the conventional generator, as above described, or it may be carried on the car as an auxiliary device and driven in any suitable manner, as for example, from the automobile engine or the ordinary six or twelve volt starting and lighting battery of the car.

Another feature of my invention is the provision of such a device that is simple, neat and compact in construction and efficient in operation.

Another feature of my invention is the making of such a generator in which the customary high voltage armature windings are eliminated. I am able to make use of only one set of armature windings and still procure both high and low voltage outputs from the same device.

In my improved device, all collector rings are eliminated and commutation or rectification of the high voltage current is simplified by the use of a relatively small number of commutator bars.

Another feature of my invention is the provision of such a device in which an alternating current transformer is mounted on the armature and rotatable therewith, such transformer receiving low voltage current and transforming it to high voltage before being taken off of the armature in a rectified condition.

Other features and advantages of my invention will appear more fully as I proceed with my specification.

In those forms of devices embodying the features of my invention shown in the accompanying drawings—

Figure 1 is a diagrammatic view in side elevation of an automobile motor showing my generator mounted thereon; Fig. 2 is a vertical sectional view of the generator; Fig. 3 is a wiring diagram of the device of Fig. 1; Fig. 3ª is a sectional view of the transformer taken as indicated by the line 3ª of Fig. 2; Fig. 4 is a view similar to Fig. 3, showing a modified form; and Fig. 4ª is a sectional view of the transformer shown in Fig. 4.

As shown in the drawings, 10 may indicate the ordinary internal combustion engine of an automobile, and 11, a shaft driven thereby.

My improved generator is indicated in general by 12 and when mounted on an automobile, it may be driven by the engine, for example, from the shaft 11. As here shown, the drive is effected through an overrunning clutch of any suitable design to permit the generator to continue at a satisfactory operating speed after the engine stops or slows down below an effective driving speed.

Although I have here shown the generator as driven by an automobile engine through an overrunning clutch, it is to be understood that it may be driven in any other manner and by any other means. It may be driven by a battery, for example, the ordinary starting and lighting battery of a car.

In describing the construction and operation of my generator, I shall point out only the characteristic and distinguishing features thereof, it being understood that in the construction of the same, the details familiar to those skilled in the art are to be employed. Likewise, it is to be understood that the wiring diagrams, and other views, are largely diagrammatic. In the actual use of the apparatus, any necessary or desirable switches, insulators, relays, fuses, or other devices (not here shown) customarily employed in connection with devices of this kind may be used.

The generator, as here shown, is housed in a suitable cylindrical casing 12 with end plates 14 and 15 carrying the bearings 16 and 17 supporting the ends of the armature shaft 18. Numerals 19, 19 indicate the usual field coils which are here shown as shunt wound.

Numerals 20, 20 indicate the usual armature windings on the core 21; and 22, 22, the usual commutator or commutator bars to which they are connected. 23, 23 indicate the brushes for taking off the low voltage rectified current from the commutator 22, said current being delivered to the wires 23ª, 23ª.

Numeral 24 indicates, in general, an alternating current transformer mounted on the armature shaft 18 and rotatable therewith. As here shown, this may include the closed core 25 with the primary and secondary coils 26 and 27 wound thereon. The terminals of the primary coil 26 are connected to two diametrically opposite commutator bars 22ª, 22ª by the wires 26ª, 26ª. The terminal wires 27ª, 27ª of the secondary coil are connected to two high voltage commutator bars 28, 28 on the end of the shaft 18 opposite the commutator 22. The high voltage current in a rectified condition is taken off the commutator bars 28, 28 by the brushes 29, 29 which are connected to the wires 29ª, 29ª These wires may lead to a suitable filter, or other apparatus (not shown) to filter or smooth out the current before it is supplied to the radio receiver.

If the generator is mounted on an automobile engine and used to charge the starting and lighting battery, the connections may be as shown in Fig. 3, in which 30 indicates such a battery. Numeral 31 indicates a switch to shut off operation of the generator by the battery when desired. When so connected, it is contemplated that the engine will drive the generator through the overrunning clutch 13 and that such generator will charge the battery 30 and furnish a "B" current for a radio receiver 32 through the wires 29ª, 29ª. When the engine stops or slows down below an effective operating speed, there will be a reverse flow of current from the battery to the generator which will serve to drive it and cause it to continue to furnish a high voltage radio "B" current.

In the modified form shown in Figs. 4 and 4ª I provide a double transformer instead of a single one to give a smoother or more even high voltage output current. As here shown, the transformer is indicated in general by 124 and includes two closed cores 125, 125 each having a primary winding 126 and secondary winding 127. The terminals of each primary are connected to two diametrically opposite commutator bars 122ª of the commutator 122, and the two pairs are shifted 90° with respect to each other. The secondary coils 127 are connected by the wires 127ª to a four bar commutator 128 supplying rectified current to the brushes 129 from which current is fed to the radio by the wires 129ª. It is to be understood that, except as above described, the construction and operation of the device of Figs. 4 and 4ª is similar to the one shown in the other figures.

In my improved device, the output voltage can be changed by merely changing the transformer 24 or 124; and even without changing the transformer, the characteristics of such current may be varied by rotatably shifting the brushes 29, 29 or 129, 129, 129. Such brushes may be shifted by rotating the end piece 14.

It has been stated that the generator may be driven by a battery, for example, the ordinary starting and lighting battery of a car; and it has been stated that an overrunning clutch is provided to permit the generator to continue at a satisfactory operating speed after the engine stops or slows down below an effective driving speed. I believe it is better to make this more clear. In case the engine of the automobile is not running, the entire drive for the device is effected from the battery 30. In such case, the device acts merely as a current changing device. That is, it changes a low voltage direct current to a high voltage direct current. In other words, it steps up the six-volt direct current furnished by the battery 30 to a high voltage direct current delivered through the wires 29ª of Fig. 3 or 129ª of Fig. 4. When thus operating, the current from the battery 30 drives the device. The current is supplied by the brushes 23 or brushes 123 to the commutator 22 or 122. The field and armature windings constitute a motor to rotate the shaft. Some of the alternating current in the armature windings is taken off through the wires 26ª of Fig. 3 or the wires 126ª of Fig. 4 to the alternating current transformer mounted on the shaft. The alternating current is transformed to a higher voltage rectified by means of the commutator 28 or 128 and the high voltage direct current (interrupted) is supplied through the wires 29ª or 129ª.

Although I have shown the alternating current coming from the secondary of the transformer as being rectified by means of the commutator 28 or 128, it is to be understood that other means, of desired, may be employed for rectifying such current. For example, the A. C. current delivered by the transformer could be taken off by means of collecting rings and then rectified by other means, for example, a rectifying tube. Also, if desired, said current could be rectified by other means on the shaft before being taken off.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A unitary device in a suitable casing, including; a rotatable member; a stationary magnetic field system surrounding the rotatable member; an armature winding on the rotatable member within said magnetic field system; a low voltage input direct current commutator on the rotatable member with its segments connected to the armature winding; an alternating current transformer mounted on the rotatable member and rotatable therewith, the primary coil of said transformer being connected to the armature winding; a high voltage rectifying output commutator on the rotatable member with its segments connected to the secondary winding of the transformer; and brushes in contact with the segments of said high voltage commutator for taking direct current therefrom.

2. A unitary device in a suitable casing, including; a rotatable member; a stationary magnetic field system surrounding the rotatable member; an armature winding on the rotatable member within said magnetic field system; a low voltage input direct current commutator on the rotatable member with its segments connected to the armature winding; a plurality of alternating current transformers mounted on the rotatable member and rotatable therewith, the primary coils of said transformers being connected to the armature winding; a high voltage rectifying output commutator on the rotatable member with its segments connected to the secondary windings of the transformers, there being a segment for each terminal of each secondary winding; and brushes in contact with the segments of said high voltage commutator for taking direct current therefrom.

In witness whereof, I have hereunto set my hand this 14th day of October, 1931.

GEORGE A. SCHUCHMAN.